Nov. 4, 1958     A. W. HARPER     2,858,837
FOLDABLE PROTECTOR FOR AUTOMOBILES AND THE LIKE
Filed May 18, 1956
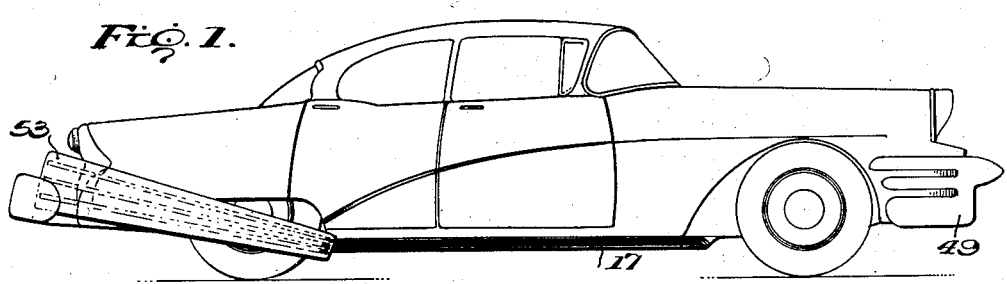
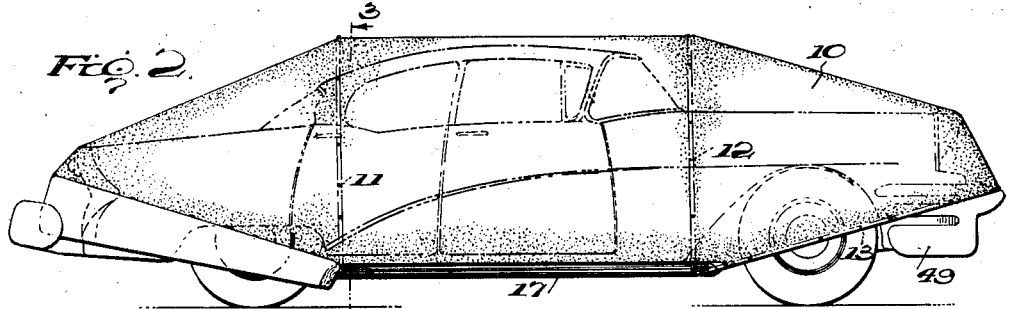
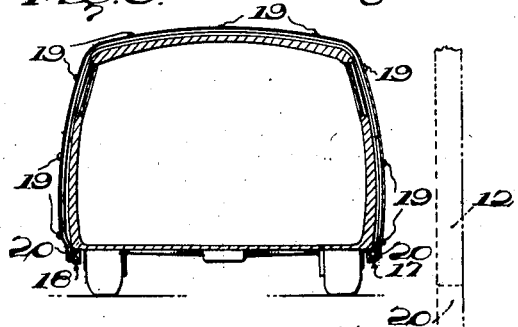
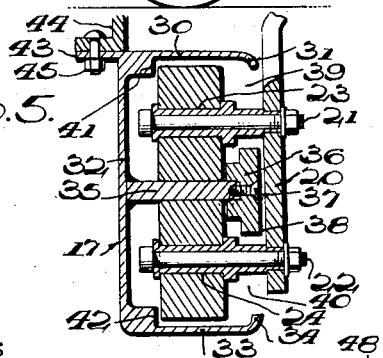
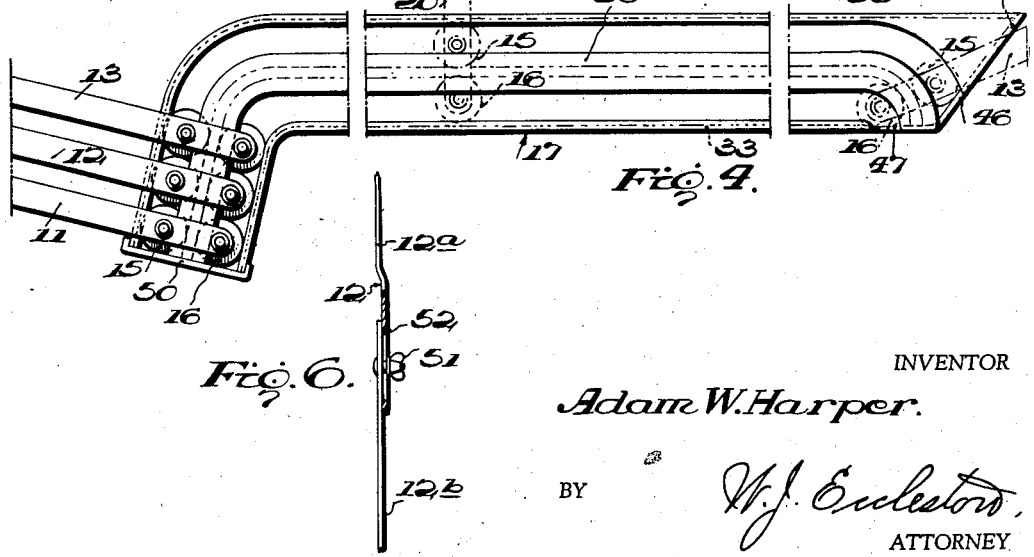
INVENTOR
*Adam W. Harper.*
BY *W. J. Eccleston,*
ATTORNEY

United States Patent Office 2,858,837
Patented Nov. 4, 1958

2,858,837

FOLDABLE PROTECTOR FOR AUTOMOBILES AND THE LIKE

Adam W. Harper, Harrisburg, Pa.

Application May 18, 1956, Serial No. 585,914

5 Claims. (Cl. 135—4)

(Granted under Title 35, U. S. Code (1952), sec. 266)

The invention described herein, if patented, may be manufactured and used by or for the Government for governmental purposes, without the payment to me of any royalty thereon.

This invention relates to flexible extensible and foldable projectors or covers for automobiles, trucks and other vehicles.

There are many occasions when a protector or cover of the type hereinafter described may be found useful. Often a car is put in "dead storage" in a garage or on a lot, and for such cars, a cover is desirable to keep dust, leaves, trash, frost, dew, snow, etc., off the car body and out of the engine compartment. My cover will also protect the paint and bright metal finish of the car, hence may be advantageous when shipping cars by common carrier or truck, as well as when parking cars on the street, on driveways or in "carports," and may serve to discourage childish or malicious passers-by from damaging parked cars thereby protected. Also my cover may be installed permanently on a car and after a day's run may be spread over a car exposed to the weather, thereby giving the car owner most of the protection of a garage without the expense of one.

The general objects of the invention are to provide a protecting cover which is easily placed over a car, which is easily removed, and which is not so complicated in construction but that it may be manufactured and sold at a reasonable cost. A more specific object is to provide a protecting cover which may be put on and removed by one person, being light in weight and simple to operate and fix in position. Other objects will be pointed out or will be obvious from the following description of the preferred embodiment of the invention shown in the accompanying drawings forming a part of this specification.

In said drawings:

Fig. 1 is a side elevation of an automobile with the protector installed thereon, the protector being fully folded at the rear of the automobile;

Fig. 2 is a similar view showing the protector fully extended to substantially cover the body of the car;

Fig. 3 is a cross section approximately on line 3—3 of Fig. 2 looking toward the rear of the car;

Fig. 4 is an enlarged elevation of the roller tracks and the lower ends of the U-shaped frames which support and stretch the fabric body of the protector;

Fig. 5 is a vertical cross section showing the lower end of a U-shaped frame, its two rollers, and the roller tracks; and Fig. 6 is a detail in sectional elevation showing an arrangemnt for adjusting the length of the two legs of a U-shaped frame.

Referring particularly to the drawings, the protector cover of my invention includes a fabric cover 10, at least three cover-supporting frames 11, 12, 13, a pair of rollers 15, 16 mounted on each of the lower ends of the frames, and a pair of dual rollerways 17, 18, the dual rollerways being fixed on opposite sides of the car body and supporting the frames and hence the cover 10. The fabric cover 10 may be of transparent resinous plastic, which would be satisfactory for indoor use or for outdoor use if the cover is not exposed to the sun; but if the cover is to be used in all weather conditions, a fully opaque light-reflecting cover, preferably a pure white plastic cover, would be best suited to protect the automobile, as such a cover will reflect most of the radiant heat rays of the sun. The cover 10 has sufficient dimensions to stretch from the forward end of the car to the rear end, as shown in Fig. 2, and it fits over the frames 11—13, being secured to said frames by snap fasteners 19, preferably at least nine fasteners being used on each frame, as indicated in Fig. 3. The snap fasteners are not shown in detail because they may assume different forms, one satisfactory type being the "Dot" fastener of the United-Carr Fastener Company, an early form of which is shown in the Carr Patent No. 1,524,637 dated Jan. 27, 1925.

Each of the frames 11—13 is shaped generally like an inverted U and has its top portion somewhat curved and its sides somewhat bowed with the two lower ends bent inwardly, as shown at 20 (Figs. 3 and 4). Fixed at right angles to each of these lower ends are a pair of bolts 21, 22 over which bearing sleeves 23, 24 are slipped, with rollers 15, 16 mounted for rotation on said bearing sleeves. If low friction is desired, ball or roller bearings (not shown) will be used. Rollers 15, 16 have their axes parallel and horizontal and roller 15 is directly above roller 16 when the supported frame is upright, as shown in the central portion of Fig. 4.

The dual rollerways may have several forms, their function being to support the frames 11—13, permit their movement lengthwise of the car, and prevent either side swaying (transversely of the car) or falling of the upright frames. As shown in Figs. 4 and 5, the dual rollerway 17, which is like rollerway 18 on the other side of the car, includes a top plate 30 having a downturned flange 31, a side plate 32, a bottom plate 33 and an upturned flange 34. The elements 30—34 may be parts of a single piece of rolled steel treated to resist rust, or aluminum or magnesium alloy. A track member 35 may be welded or otherwise secured to the side plate 32 on the inside surface to lie at right angles to said plate or, for the most part, in a horizontal plane. Track member includes a roller-holding member 36 which may be secured by studs 37 to the track member and which has its outside vertical surface 38 flush with the outside surfaces of flanges 31, 34. The roller-holding member 36 is however widest at its outer portion where it is spaced at its upper and lower edges from the edges of the downturned and upturned flanges 31, 34, as indicated at 39, 40; and the bolts 21, 22 and their bearing sleeves 23, 24 project through spaces or slots 39, 40 respectively. The inner or narrower portion of the roller-holding member 36 provides guiding flanges for the rollers 15, 16 which roll over the upper and lower surfaces respectively of track member 35. Other flanges 41, 42, formed on the inner face of side plate 32 at the corners where the top plate 30 and the bottom plate 33 are joined, also provide guides for the rollers 15, 16. Each roller thus rolls on track member 35 and has its side faces in contact with either the inner portion of the roller-holding member 36 or with one of the flanges 41, 42, responsive to the forces acting on the frame that is partly supported by said roller. An attaching flange or a series of plates 43, fixed to top plate 30, and extending outwardly therefrom at any convenient angle, is adapted to support the rollerway from the lower edge 44 of the automobile body, bolts 45 with lock nuts being used for this purpose. Thus the rollerway may be affixed to a car body without any change in the latter except drilling bolt holes in locations where they will not mar the appearance of the car, should the rollerway be removed.

At the forward end, each rollerway has an integral stop plate 46 that is inclined to the vertical, which prevents the rollers from moving out of that end of the rollerway, and the slots 39, 40 and roller-holding member 36 are curved downwardly at said end. A gap 47 in bottom plate 33 permits the lower roller 16 to project slightly beyond the rollerway when the frame 13 has been rolled all the way forward (dotted lines of Fig. 4) and at this time, frame 13 extends through a slot 48 in stop plate 46 and lies over or adjacent the forward bumper structure 49 of the car, as shown in Fig. 2. At the rear end, each rollerway is inclined downwardly at an angle of about 75° to the horizontal. A removable stop plate 50, secured by studs, acts to prevent the rollers from falling out the rear end of the rollerway and when removed, permits the frames with their rollers to be assembled on the rollerways. The frames are assembled one at a time and are rolled along the rollerways until they are in convenient positions for assembling the fabric cover, which is pulled over the frames and snap-fastened in place. When the protector is completely extended over the car, its rear and forward frames 11 and 13 may simply rest on the rear and forward bumper structure, respectively, or hold-down means such as spring-hooks (not shown) may be used to secure the protector structure to the car, this being particularly desirable to prevent the wind from blowing the protector and perhaps tearing the fabric loose or even lifting it off the car. When a frame is upright, the two rollers at each end hold it upright, resisting stresses both transversely and longitudinally of the car, due to the peculiar structure of the rollerways and their engagement with the sides and peripheries of the rollers, as described.

One or more of the frames may be made longitudinally adjustable to accommodate the protector to service with different height of car bodies. As shown in Fig. 6, the frame 12 is in two parts, 12a and 12b, and a bolt and wing nut assembly 51 is fixed to the lower part 12b and passes through a slot 52 in upper part 12a, the wing nut being tightened when the frame has been extended or contracted to the desired extent. Both sides of frame 12 will have this adjustment, of course. Other slip joints accomplishing the same result are well known and any such construction may be used in lieu of the form of Fig. 6. If the frames are properly adjusted lengthwise, several different sizes of fabric covers 10 may be attached to a set of frames to adapt the protector to cars of different models. The frames could easily be made adjustable transversely to accommodate cars of different widths, by using the construction of Fig. 6, or its mechanical equivalent, in the top transverse portion of each frame. While this is not shown, it will be readily understood from the drawings (Figs. 3 and 6) and needs no illustration.

The manner of assembling and using the protector has been made clear in the foregoing description. When the protector is folded, its three frames rest one on top of the other at the rear of the car and a fabric cover 53 may be wrapped about the protector and secured by snap fasteners or straps (not shown). Cover 53 may be similar to the well known fabric covers used to protect folding tops of automobiles and therefore is not shown in detail.

The described protector may be raised and lower mechanically by a mechanism operated by battery power or a power take-of from the engine, or a cable and winch mechanism may be devised to accomplish this result. The flexible fabric may be in two or more parts each secured by snap fasteners to the frames; this makes possible the use of two or more different fabrics for each protector. Other modifications will occur to those skilled in the art.

Having described my invention, I claim:

1. A protector for automotive vehicle bodies comprising in combination, an assembly including a pair of rollerways adapted to be attached on opposite sides of a vehicle body to the lower edge portions thereof, said rollerways extending longitudinally of said body for the major portion of the distance between the front and rear wheels of said vehicle and having downturned end portions; a plurality of frames each adapted to straddle the vehicle body transversely; a pair of rollers arranged one above the other on fixed parallel axes adjacent each end of each such frame; dual-function means built into the rollerways providing upper and lower track surfaces for the rollers and also providing means to prevent the rollers from falling out of the rollerways while holding the frames in vertical and vehicle-body-embracing positions when put in such positions by an operator, said dual-function means following the contour of the rollerways; and a flexible fabric detachably secured to the outside of the several frames and adapted to substantially cover said body.

2. The invention defined in claim 1, wherein one of the downturned end portions of the rollerways extends further down toward the ground than the other portion, and wherein the frames have means making them manually extensible and contractible to accommodate the frames to different sizes of vehicle bodies.

3. The invention defined in claim 1, wherein the frames and the flexible fabric have complemental snap fastener elements so that the flexible fabric may be readily attached to and removed from the several frames.

4. In combination, a pair of rollerways extending substantially in parallelism and adapted to be fixed to an automotive vehicle body to extend longiutdinally thereof in straight lines for the major portion of the distance between the front and rear wheels on both sides of the body and being curved downward at their outer end portions; each rollerway having a dual roller track; a plurality of frames each of which has an inverted U-shape; dual rollers arranged one above the other on parallel horizontal axes and running over said dual roller tracks; means to support each of said frames at each end on a pair of said rollers, so that each frame is supported on opposite sides of the body by said rollerways; means on each rollerway and engageable with opposite sides of each of the dual rollers to hold the rollers against substantial lateral movement on the tracks, the rollerways and rollers holding each frame upright when the frame is placed in that position; and a sectional flexible fabric fitting over the outside of the frames and secured thereto and being of sufficient dimensions to substantially cover the vehicle body when spread out.

5. The invention defined in claim 4, wherein the rollerways have downwardly inclined or curved portions at each end to permit a frame with its rollers to move from a vertical position to a position inclined to the vertical at each end of the vehicle, so that the flexible fabric and the frames supporting it may be stretched over substantially the entire vehicle body or may be folded at the rear end of the vehicle body; the rollerways being closed at their rear ends to hold the rollers therein but being open at their forward ends to permit assembly or disassembly of the frames on or off the rollerways.

References Cited in the file of this patent

UNITED STATES PATENTS

| Number | Name | Date |
|---|---|---|
| 364,034 | Nye | May 31, 1887 |
| 841,719 | Ross | Jan. 22, 1907 |
| 1,009,999 | Smith | Nov. 28, 1911 |
| 1,263,759 | Hanaway | Apr. 23, 1918 |
| 1,413,529 | Hansen | Apr. 18, 1922 |
| 2,598,940 | Robie | June 3, 1952 |